(12) United States Patent
Giddings et al.

(10) Patent No.: US 7,791,464 B1
(45) Date of Patent: Sep. 7, 2010

(54) TRACTOR-TRAILER RIG DEPLOYABLE SIGN

(76) Inventors: Jason Myron Giddings, 49085 NW. Strohmayer, Forest Grove, OR (US) 97116; Roger Giddings, 5909 N. Perrine Rd., Spokane, WA (US) 99217; Paula Marie Giddings, 5909 N. Perrine Rd., Spokane, WA (US) 99217

( * ) Notice: Subject to any disclaimer, the term of this patent is extended or adjusted under 35 U.S.C. 154(b) by 374 days.

(21) Appl. No.: 11/821,030

(22) Filed: Jun. 21, 2007

(51) Int. Cl.
*B60Q 1/52* (2006.01)
(52) U.S. Cl. ............... 340/472; 340/471; 340/468; 340/425.5; 340/431; 340/480; 340/475; 40/591; 116/51; 116/39
(58) Field of Classification Search ........... 340/472, 340/471, 468, 425.5, 431, 490, 433, 480, 340/487, 473, 475; 40/591, 584; 116/50, 116/51, 39
See application file for complete search history.

(56) References Cited

U.S. PATENT DOCUMENTS

| | | | |
|---|---|---|---|
| 4,156,232 A | 5/1979 | Blass | 340/168 R |
| 4,297,675 A | 10/1981 | Rubottom et al. | 340/107 |
| 4,476,747 A * | 10/1984 | Kawamoto | 477/146 |
| 4,956,630 A | 9/1990 | Wicker | 340/433 |
| 5,038,136 A | 8/1991 | Watson | 340/480 |
| 5,134,385 A | 7/1992 | Coleman | 340/473 |
| 5,166,663 A | 11/1992 | Leis | 340/433 |
| 5,281,948 A | 1/1994 | Estrada | 340/433 |
| 5,355,117 A | 10/1994 | Jefferson | 340/425.5 |
| 5,406,251 A | 4/1995 | Leis | 340/433 |
| 5,430,625 A | 7/1995 | Abarr et al. | 362/80 |
| 5,781,120 A * | 7/1998 | Kucik | 340/425.5 |
| 5,796,331 A | 8/1998 | Lamparter | 340/433 |
| 5,812,052 A | 9/1998 | Swanger et al. | 340/433 |
| 5,847,642 A | 12/1998 | Esposito et al. | 340/433 |
| 5,854,517 A * | 12/1998 | Hines | 307/10.8 |
| 6,060,788 A * | 5/2000 | Carlson et al. | 307/10.8 |
| 6,069,559 A | 5/2000 | Davis et al. | 340/468 |
| 6,084,507 A * | 7/2000 | Butler et al. | 340/437 |
| 6,087,777 A | 7/2000 | Long | 315/82 |

(Continued)

FOREIGN PATENT DOCUMENTS

GB 2313746 A * 12/1997

*Primary Examiner*—Brian A Zimmerman
*Assistant Examiner*—Kevin Lau
(74) *Attorney, Agent, or Firm*—Timothy E. Siegel Patent Law, PLLC

(57) ABSTRACT

A method of providing a user controllable sign, on the trailer of a tractor-trailer rig. The tractor includes a cab and the trailer is electrically connected to the tractor by way of a jack that provides a set number of electrical connections between the tractor and the trailer. The method begins with the installation of a manual input device in the cab. This device creates a signal that can be overlaid on a jack input without disrupting the input and is electrically connected to a jack input. Also, a signal receiving unit is installed in the trailer, and is connected to a wire electrically connected to the jack input that receives the user signal from the manual input device. This unit is able to determine the presence of the signal from the manual input device. Also installed in the trailer, is a sign deployment controller that is at least in part responsive to the user signal receiving unit. Finally, a sign assembly, controlled by the sign deployment controller, is installed.

12 Claims, 8 Drawing Sheets

U.S. PATENT DOCUMENTS

| | | | |
|---|---|---|---|
| 6,361,196 B1 | 3/2002 | Boucheron et al. | 362/546 |
| 6,545,600 B1 | 4/2003 | Boner | 340/468 |
| 6,652,182 B1 | 11/2003 | Ellefson | 404/9 |
| 6,765,481 B2 | 7/2004 | Haigh et al. | 340/433 |
| 6,778,077 B1 | 8/2004 | DeGraaf | 340/468 |
| 6,970,074 B2 | 11/2005 | Perlman | 340/426.1 |
| 7,002,458 B2 | 2/2006 | Su | 340/465 |
| 7,026,919 B2 | 4/2006 | Perlman et al. | 340/426.18 |
| 7,164,352 B2 | 1/2007 | Nelson | 340/472 |
| 7,173,523 B2 | 2/2007 | Matsuoka | 340/471 |

* cited by examiner

TRACTOR-TRAILER RIG DEPLOYABLE SIGN

BACKGROUND

One source of expense to trucking companies is liability arising from accidents in which a truck runs over a car, while making a right hand turn. As illustrated in FIG. 1, a tractor-trailer 10 rig has a large turning radius, compared with cars, and accordingly must typically pull into the left lane 25 of a road in preparation for making a right hand turn, in order to clear the nearest corner 40. A car 30 that pulls up in the right lane 20 next to the rig 10, is likely to be run over by the truck's rear wheels 15 as the truck turns right, as is evident from the figure.

A number of parties have attempted to develop a system to remedy this problem. One of these systems is disclosed in U.S. Pat. No. 5,781,120, issued to Kucik. Kucik shows an arm that is extended outwardly from the truck to act as a warning to any car that would enter the right hand lane of the road, while the truck was in the process of making a right turn. This arm is controlled by an input device inside the tractor cab. Unfortunately, the patent gives no explanation of how a signal is delivered to the arm mechanism from the input device in the cab. Although a reader might imagine various embodiments, some involving a punch to create a hole in the tractor shell, to permit a wire to be strung out of the tractor, Kucik simply does not address the problem. Perhaps because of this gap in the teachings of Kucik, it does not appear that the product described was ever commercially produced.

Moreover, in the control scheme of Kucik, the arm is directly deployed by the driver of the truck. This may result in the arm not being deployed at times when the driver forgets to actuate the control switch.

Accordingly, there is a continuing need for a tractor-trailer rig right turn warning device that can be controlled from the tractor cab, as Kucik does not disclose how to construct such a device.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first, separate aspect, the present invention may take the form of a method of providing a user controllable sign, moveable from a non-deployed position to a deployed position, in the trailer of a tractor-trailer rig. The tractor includes a cab and the trailer is electrically connected to the tractor by way of a jack that provides a set number of electrical connections between the tractor and the trailer, each of which is dedicated to a pre-existing function. The method begins with the installation of a manual input device in the tractor cab. This device can create a user signal that can be overlaid on a jack input without disrupting the jack input. The manual input device is electrically connected to a jack input. Also, a user signal receiving unit is installed in the trailer, the signal receiving unit is connected to a wire electrically connected to the jack input and thereby receives the user signal from the manual input device and is able to determine presence or absence of the signal from the manual input device. Also installed in the trailer, is a sign deployment controller that is at least in part responsive to the user signal receiving unit. Finally, a sign assembly, controlled by the sign deployment controller, is installed.

In a second, separate aspect, the present invention may take the form of a tractor-trailer rig, comprising: the tractor-trailer rig that includes a cab, defined in the tractor and a set of wires in the tractor. A jack is located between the tractor and has a finite number of lines that can be connected between the tractor and the trailer, each of the lines is dedicated to a power or signal transmission task. A manual input device is located in the cab and is adapted to produce a signal in response to a manual input. This signal has the characteristic that it can be transmitted on one of the jack inputs without disrupting the jack input. A signal receiving unit in the trailer, which is connected to a wire electrically connected to the jack input, receives the signal from the manual input device and is able to determine presence or absence of the signal from the manual input device. A deployable sign assembly includes a sign that is moveable from a non-deployed position to a deployed position at least in part in response to the signal receiving unit.

In a third, separate aspect, the present invention is a tractor-trailer rig equipped with a user controllable sign, moveable from a non-deployed position to a deployed position. The rig includes a tractor cab and a turn signal system that has a turn signal manual input device in the cab, which can be placed in a right-hand-turn signal position, a no turn position, and a left-hand-turn position. Also, a turn signal communicative assembly is controlled at least in part by the turn signal manual input device, and is able to communicate between the tractor and the trailer. A right-hand-turn signal light and a left-hand-turn signal light are each communicatively connected to the hand turn-signal communicative assembly. A manual input device is located in the cab and has a deploy state and a non-deploy state. A signal receiving unit in the trailer is communicatively coupled to the manual input device. A deployable sign controller is at least in part responsive to the signal receiving unit and does not deploy the sign unless the manual input device is in the deploy state and the right-hand-turn signal is on.

In addition to the exemplary aspects and embodiments described above, further aspects and embodiments will become apparent by reference to the drawings and by study of the following detailed descriptions.

BRIEF DESCRIPTION OF THE FIGURES

Exemplary embodiments are illustrated in referenced figures of the drawings. It is intended that the embodiments and figures disclosed herein are to be considered illustrative rather than restrictive.

DETAILED DESCRIPTION OF THE PREFERRED EMBODIMENTS

Figure 1:
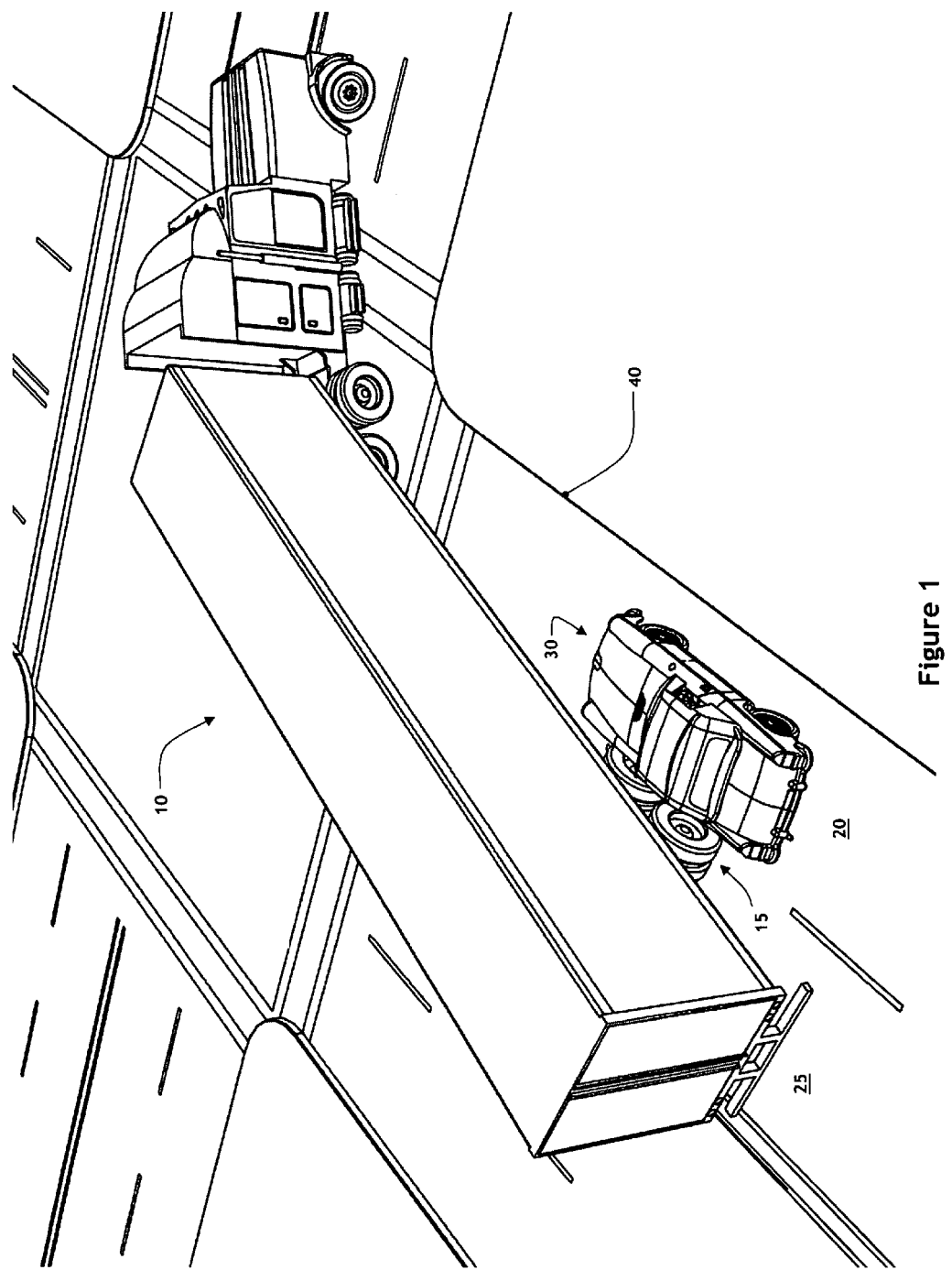
FIG. 1 is a perspective view of a prior art tractor-trailer rig making a right hand turn and potentially endangering a car.
Figure 2:
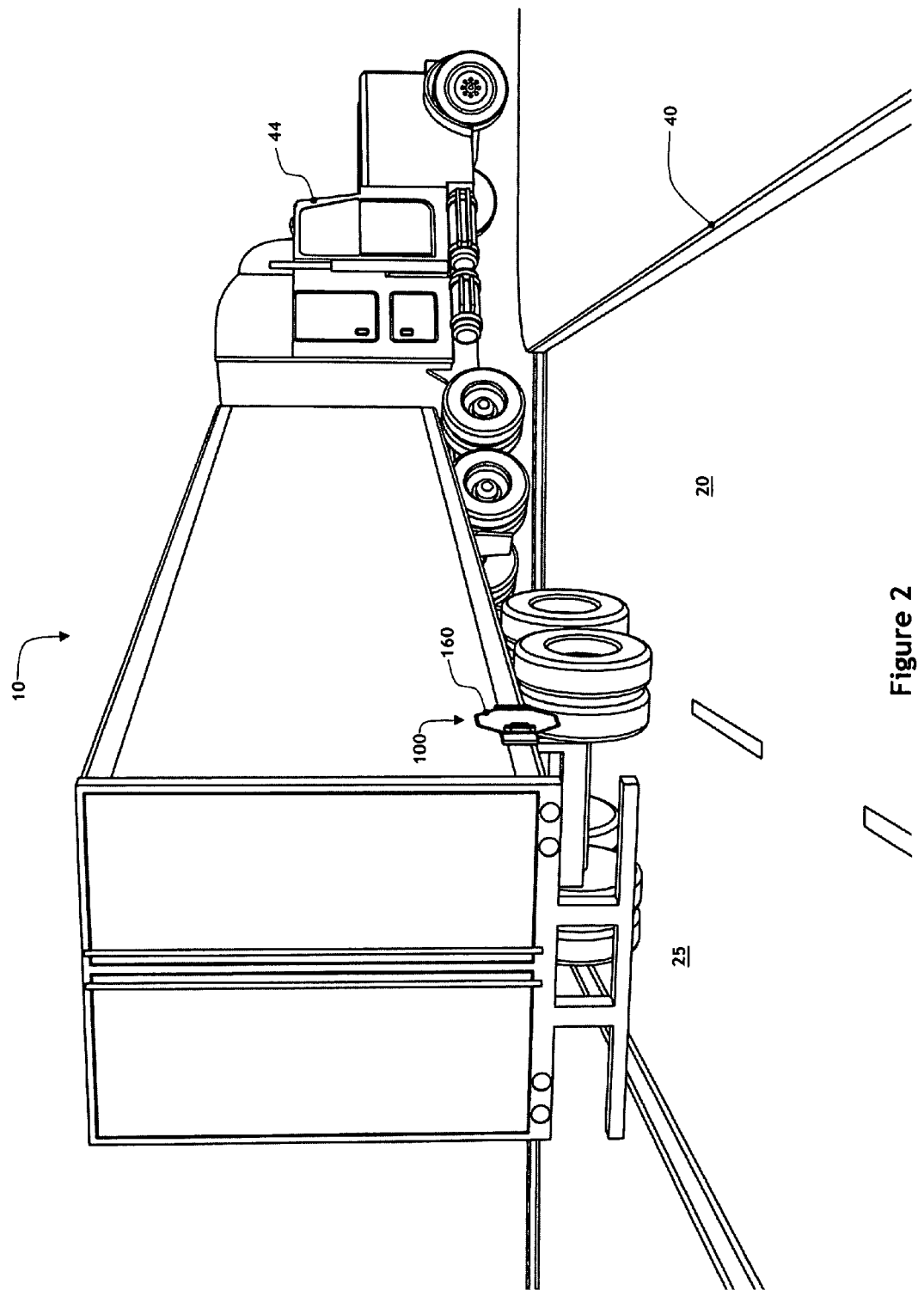
FIG. 2 is a perspective view of a tractor-trailer rig according to the present invention, beginning to make a right hand turn and with the sign of the present invention beginning to deploy.
Figure 3:
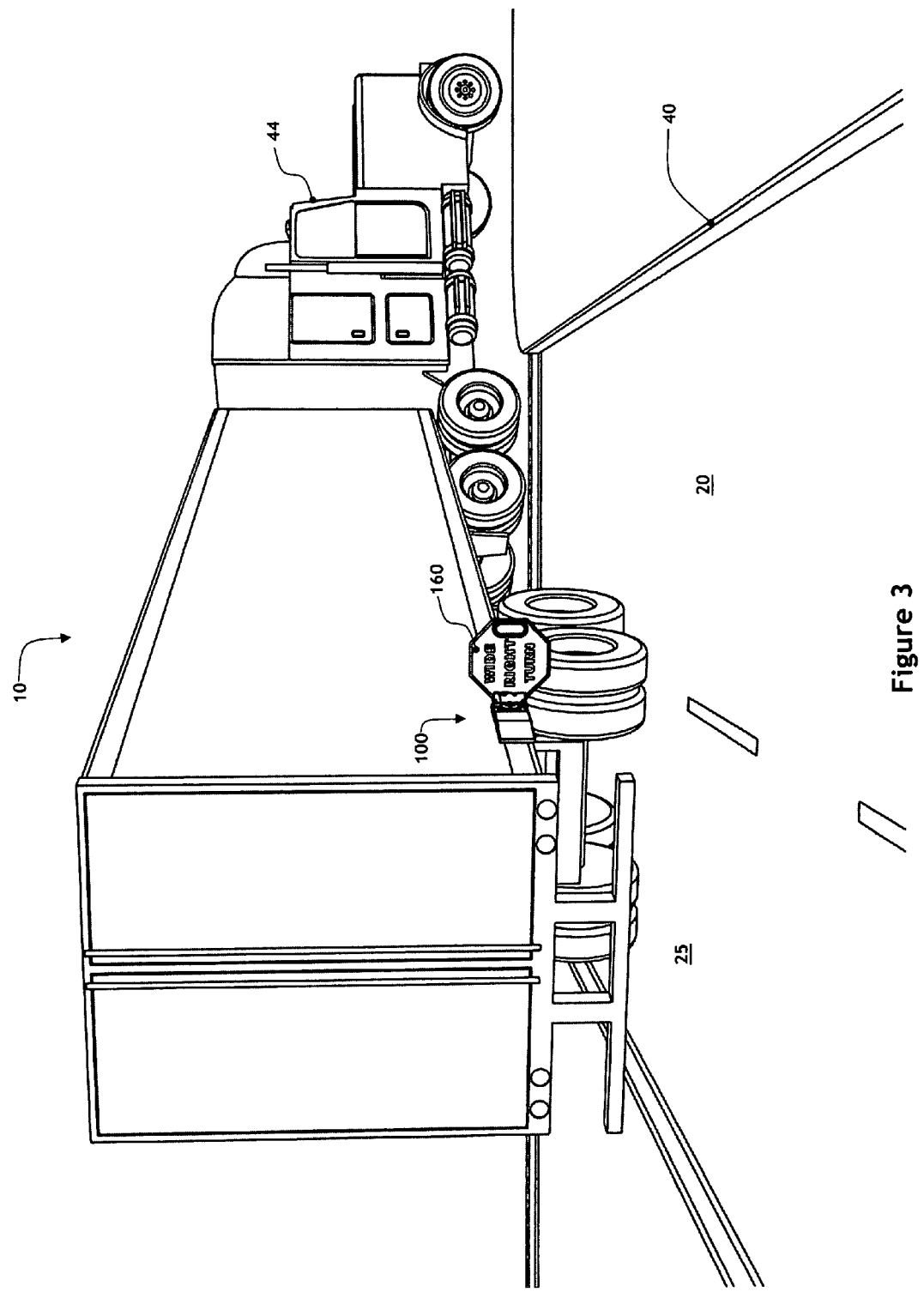
FIG. 3 is a perspective view of the tractor-trailer rig of FIG. 2, having progressed further in the right hand turn.
Figure 4:
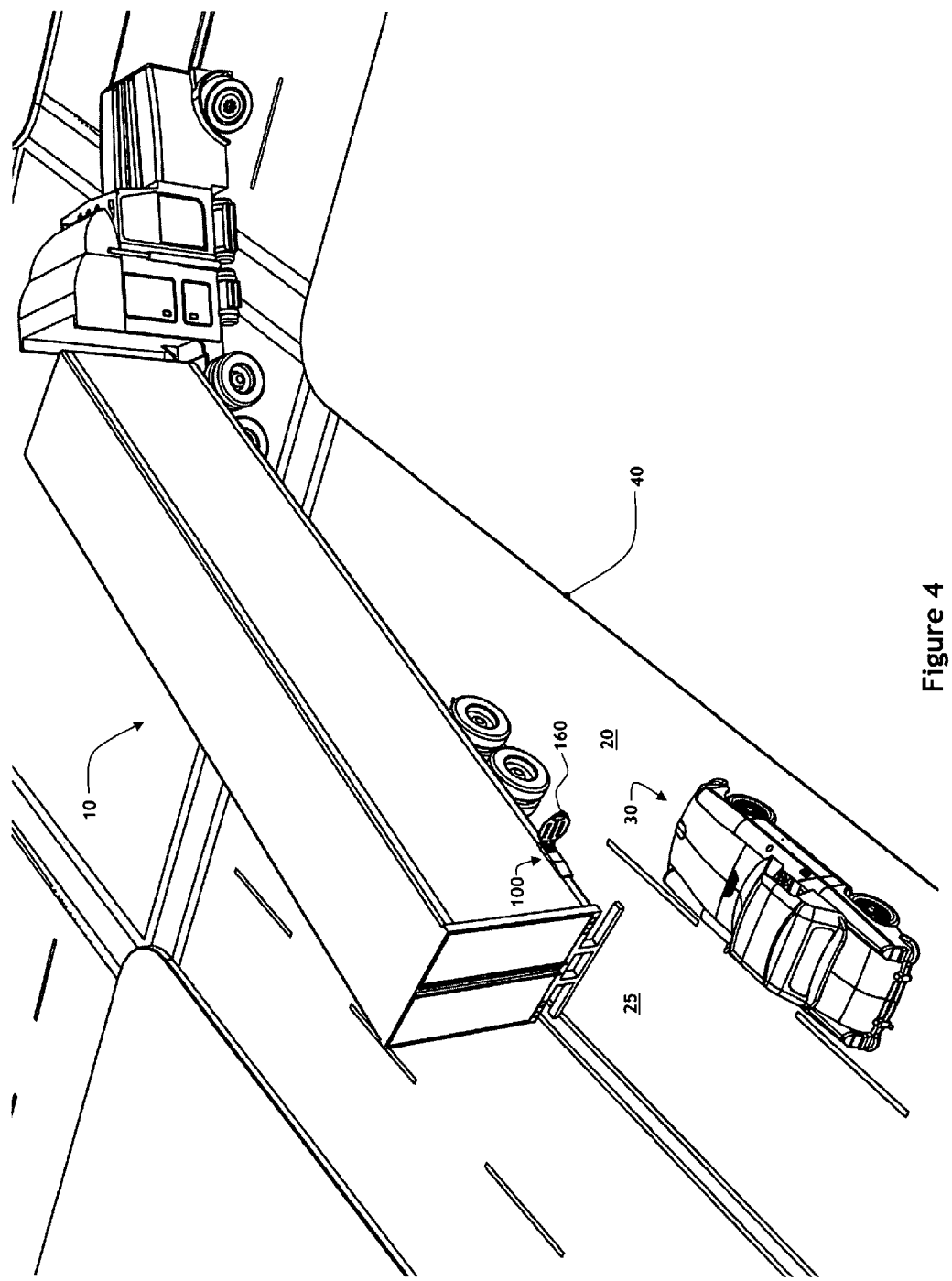
FIG. 4 is a perspective view of the truck of FIG. 3, shown from a vantage point that also shows a car that is being warned.

Referring to FIGS. 2 through 4, a truck 10 according to a preferred embodiment of the present invention, is equipped with a deployable stop sign assembly 100. FIG. 2 shows the sign 160 in a non-deployed state, whereas FIG. 3 shows it deployed. FIG. 4 shows sign 160 deployed and successfully warning a car 30 driving forward in right lane 20, from driving into the area next to truck 10, where it could be run over, as shown in FIG. 1 (discussed in the Background section).

Figure 5:
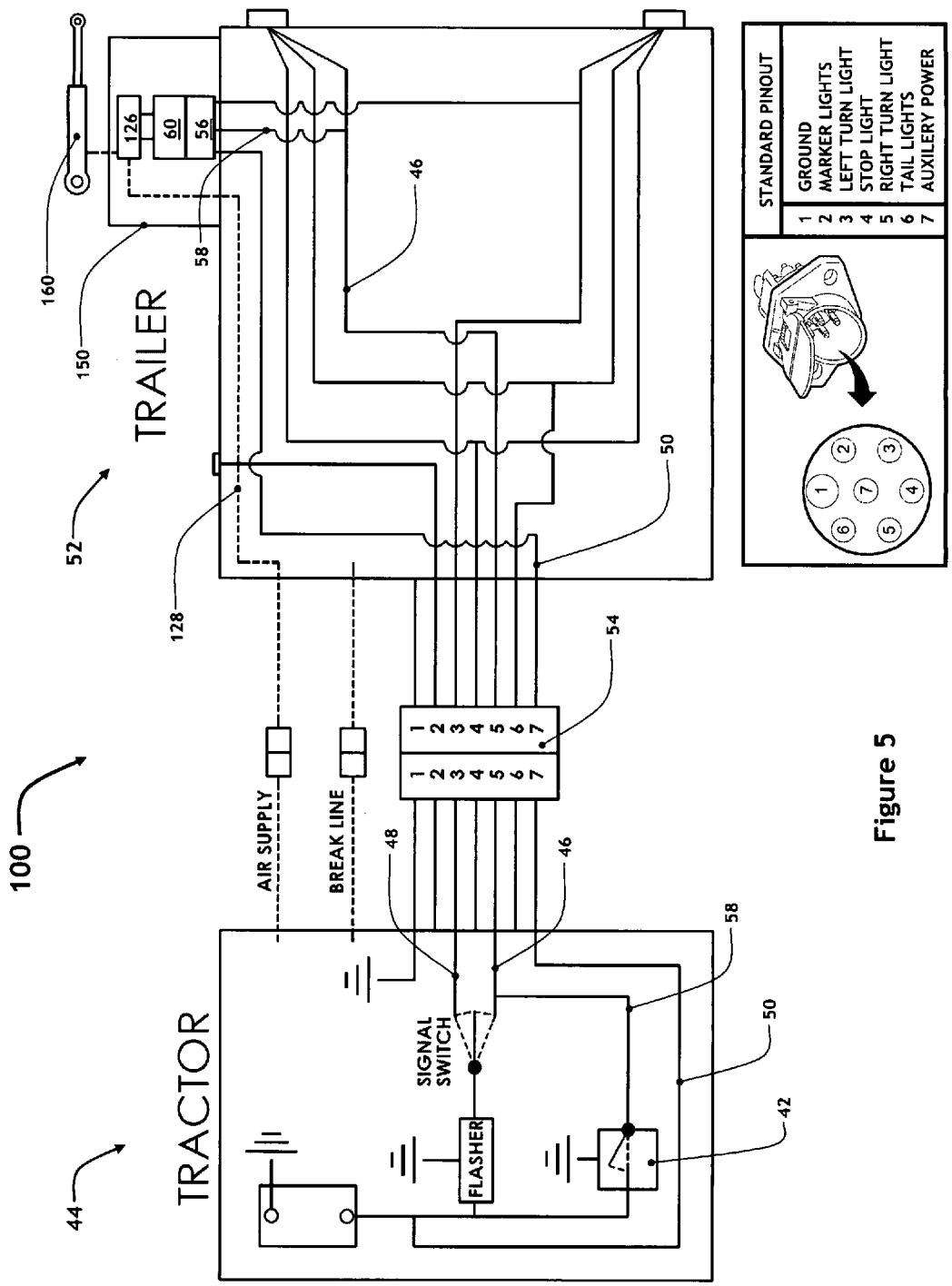
FIG. 5 is a block diagram of a tractor trailer rig according to the present invention, showing electrical connections and electrical and mechanical units.

Referring to FIG. 5, the general scheme of the sign assembly 100, in the context of the tractor trailer rig 10, includes a manual input switch assembly 42, which permits human input in the tractor cab 44 and places a 32,000 Hz signal on the right turn signal line 46 while in the "deploy" position. In alternative preferred embodiments a signal of from 50 to 10,000 Hz is used. The signal can be a sinusoid or, for example, a distinctive code sent every $1/10^{th}$ second.

As shown a left turn signal line 48, and a DC voltage line 50, used for the power supply to the trailer 52 are also used as part of the assembly 100. A standard jack 54, releasably connects a set of wires that includes lines 46, 48 and 50 from the tractor to the trailer.

A sign deployment control mechanism 150 is powered by line 50 and receives lines 46 and 48 as logic inputs. Box 150 includes a receive unit 56 that determines the presence or absence of the 32,000 Hz signal indicating that the switch 42 is in the "on" position and produces a signal 58 indicating the same. A logic unit 60 responds to the signals on lines 46 and 48 and to signal 58 by controlling a pneumatic system 126 that is powered by the air supply line 128 and that deploys sign 160.

Figure 6:
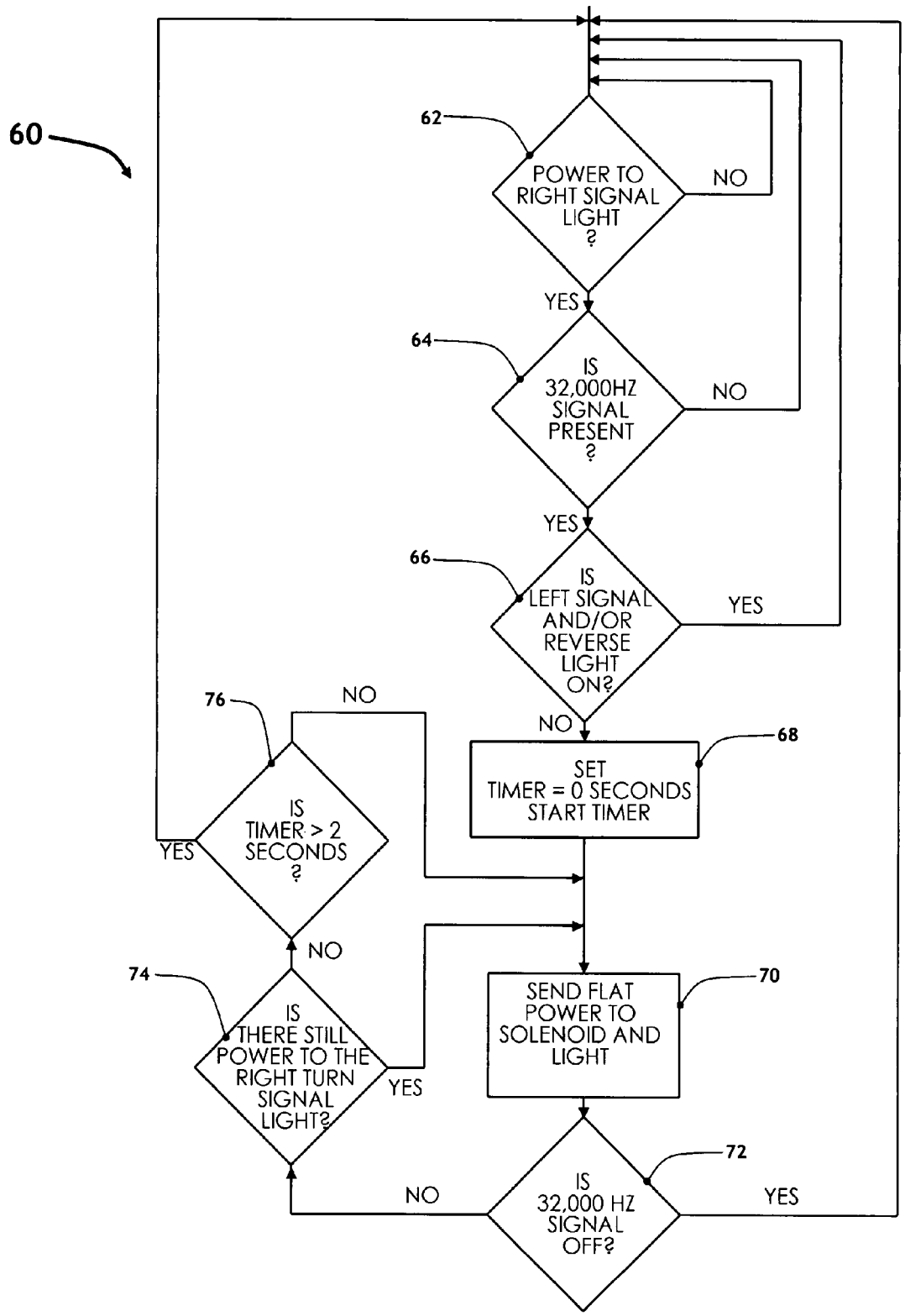
FIG. 6 is a flow chart of the logic of the sign deployment system.

Referring to FIG. 6, the logic 60 of the control mechanism 150 begins with a decision box 62, which asks if the right hand turn signal line 46 is currently energized. It should be noted that the voltage on line 46 toggles on and off at about a one Hz rate when the right turn signal has been activated. If the right-hand-turn signal is not on, the logic returns to box 62 and remains the in this first step, until a right turn signal is detected. If a right turn signal is detected, decision box 64 asks if the 32,000 Hz signal 58 is detected. If not, logic returns to box 62, but if the signal 58 is present, then decision box 66 asks if the left turn signal line 48 is on. If it is, this is an indication that the emergency flashers have been turned on and that stop sign 160 should not be deployed. Accordingly, under these conditions, control passes back to decision box 62. But if line 48 is off at the same time that line 46 is on and signal 58 is present, all of the conditions for deploying sign 160 are present. Please note that although they are separated on the flow chart, decision boxes 62 and 64 make their enquiries effectively simultaneously.

Accordingly, a two-second timer is set to zero and started (block 68) and sign 160 is deployed. The two second timer causes sign 160 to remain deployed when line 46 toggles off, as part of its light-flashing signal cycle. Logic now passes to decision box 72, which asks if signal 58 has been turned off. As long as signal 58 is still on and either right turn signal line 46 is energized or the two second timer has not timed out (decision boxes 74 and 76), the sign 160 remains deployed. When the two second timer times out, logic returns to box 62, and if the conditions of deployment are still met, block 70 is reached virtually instantaneously so that sign 160 remains deployed. If the any of the conditions of deployment are not met in boxes 62, 64 or 66 the command to deploy sign 160 is discontinued and sign 160 is retracted.

Figure 7:
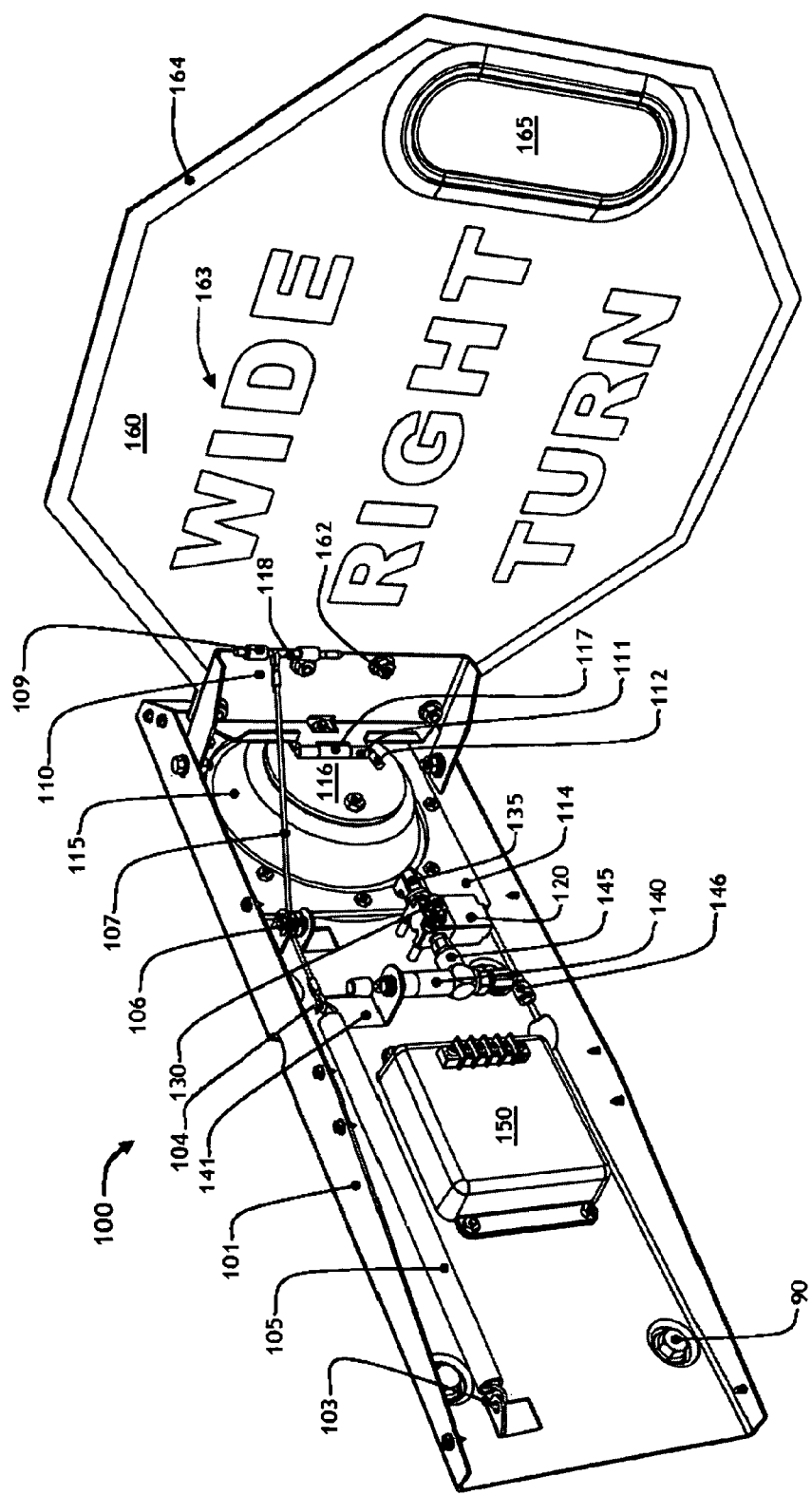
FIG. 7 is a perspective view of a sign deployment mechanism, according to the present invention.

Referring to FIG. 7, which shows the physical details of the pneumatic and mechanical sign deployment mechanism, an arm 110 is pivotally connected to a mounting bracket 101, for example by bolts 90 with locking nuts (not shown). A cover (not shown, for clarity) can cover bracket 101 and its contained hardware to form a protective housing together with bracket 101. In turn, sign 160 is attached to arm 110 by bolts 162. In an alternative preferred embodiment, the arm 110 and sign 160 may also be made as one integral component. Sign 160 contains lettering 163 which may read "Wide Right Turn," "Stop," or any other suitable message. Light 165 is part of sign 160, and is preferably a high-bright LED strobe four flashes per cycle, which is available from Grote Industries (www.grote.com) under the trademark SuperNova. Sign 160 also contains a rubberized edge 164 to protect objects from accidental contact with sign 160.

Arm 110 is connected to a pneumatic actuator 115. In a preferred embodiment, pneumatic actuator 115 is an air bladder bearing a plate 116 which supports a hinge tube 117. Arm 110 is formed with hinge tubes 111, which are configured to align with hinge tube 117. A cotter pin 112 passes through hinge tubes 111 and 117 thus creating a pivotal attachment between arm 110 and pneumatic actuator 115.

Arm 110 is also connected to spring 105 via cable 107, which is attached to a cotter pin 118 that is rotatably retained by hinge tubes 109, which are mounted to arm 110. Cable 107 passes through pulley 106 which is mounted to bracket 101. The opposite end of cable 107 attaches to a first end 104 of spring 105. A second end 103 of spring 105 is anchored to bracket 101. Spring 105 urges sign 160 to its non-deployed position when air is released from pneumatic actuator 115, thereby causing sign 160 to lie flat against bracket 101.

Bracket 101 also supports a pressure regulator 140 that includes an inlet 146 that is adapted to be connected to the air brake pneumatic line of the trailer. An electronically controlled valve 120, such as a solenoid, is in fluid communication with regulator 140 by way of regulator outlet 145. Solenoid valve 120 serves to controllably introduce pressurized air into bladder actuator 115 by way of an air silencer 130, conduit 135 and an aperture in actuator base plate 114, thereby deploying sign 160. Pressure regulator 140 reduces the air pressure from the 90 to 120 pounds per square inch (PSI) of the air brake line 128 to an air pressure of approximately 5 PSI at outlet 145. This permits the use of lower cost and more reliable low pressure components downstream from regulator 140.

Because all of the operating elements for the stop arm 100 are contained within mounting bracket 101, stop arm 100 can be mounted anywhere on the side of a trailer and does not require any hardware to be mounted inside the trailer—as many previous stop arms require.

Figure 8:
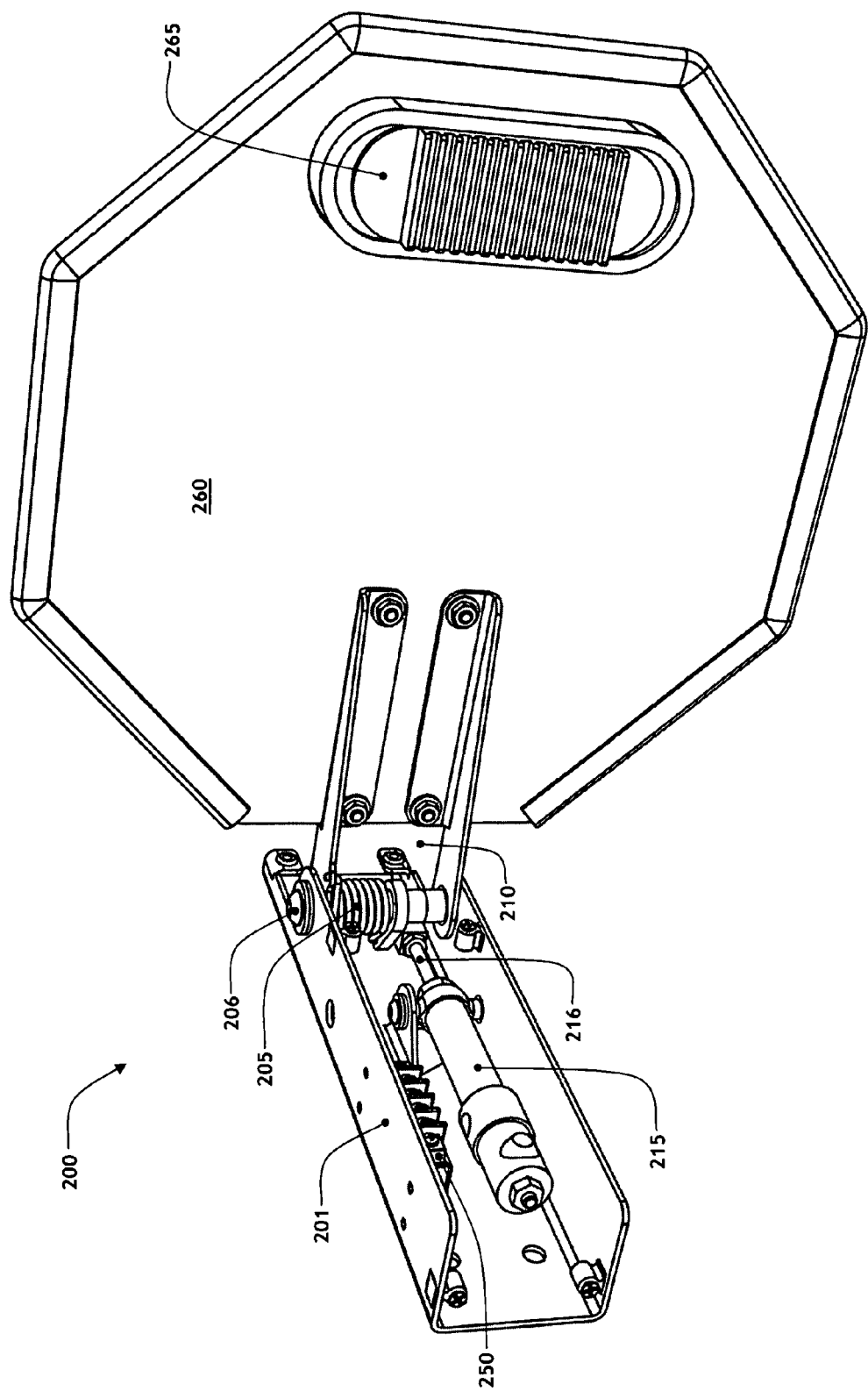
FIG. 8 is a perspective view of an alternative embodiment of a sign deployment mechanism, according to the present invention.

FIG. 8 shows an alternative preferred embodiment of a deployable sign assembly 200, having a mounting bracket 201, arm 210, an electrical control box 250 and a sign 260 bearing a warning light 265, much like the embodiment of FIG. 7. Much of the pneumatics, however, is replaced by pneumatic cylinder 215, which deploys sign 260 by pushing out piston 216. Arm 210 is mounted on hinge 206 and urged back to a non-deployed state by a coil spring 205.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A method of providing a user controllable sign, moveable from a non-deployed position to a deployed position, in the trailer of a tractor-trailer rig, having a tractor defining a cab and said trailer being electrically connected to said tractor by way of a jack, said jack providing a set number of electrical connections between said tractor and said trailer, each said electrical connection being dedicated to a pre-existing function and carrying a known signal form, said method comprising:

(a) providing a manual input device in said tractor cab, said device being capable of creating a user signal that can be overlaid on a jack input without disrupting said known signal form and electrically connecting said manual input device to a jack input;

(b) providing a user signal receiving unit in said trailer, said signal receiving unit being connected to a wire electrically connected to said jack input and thereby receiving said user signal from said manual input device and able to determine presence or absence of said signal from said manual input device;

(c) providing a sign deployment controller at least in part responsive to said user signal receiving unit;

(d) providing a sign assembly, controlled by said sign deployment controller; and (e) wherein one signal sent from said tractor to said trailer by way of said jack is a right-turn signal and wherein said deployment controller automatically deploys said sign when both said user signal and said right-turn signal are on and retracts said sign after either said user signal or said right-turn signal is turned off.

2. The method of claim 1, wherein said user signal has a frequency of between 10 and 100,000 Hz.

3. The method of claim 1, wherein said user signal has a frequency of between 100 and 50,000 Hz.

4. The method of claim 1, wherein said user signal has a frequency of between 500 and 40,000 Hz.

5. The method of claim 1 wherein said user signal is placed on the same jack input as said right-turn signal.

6. The method of claim 1, wherein said trailer includes a compressed air line and said sign assembly is in fluid communication with said compressed air line and uses compressed air to deploy said sign.

7. The method of claim 1, wherein said trailer includes a wire that is constantly energized and wherein said signal receiving unit is powered by said wire.

8. A tractor-trailer rig, comprising, (a) a cab, defined in said tractor;

(b) a set of wires in said tractor;

(c) a jack, located between said tractor and said trailer, said jack having a finite number of lines that can be connected between said tractor and said trailer, each of said lines being dedicated to a jack input signal;

(d) a manual input device, located in said cab and being adapted to produce a signal in response to a manual input;

(e) said signal having the characteristic that it can be transmitted on one of said jack inputs without disrupting said jack input signal; and (f) a signal receiving unit in said trailer, said signal receiving unit being connected to a wire electrically connected to said jack input and thereby receiving said signal from said manual input device and able to determine presence or absence of said signal from said manual input device; and (g) a deployable sign assembly, including a sign that is moveable from a non-deployed position to a deployed position at least in part in response to said signal receiving unit; and (h) wherein one signal sent from said tractor to said trailer by way of said jack is a right-turn signal and wherein said deployment controller automatically deploys said sign when both said user signal and said right-turn signal are on and retracts said sign after either said user signal or said right turn-turn signal is turned off.

9. The tractor-trailer rig of claim 8, wherein said user signal has a frequency of between 10 and 100,000 Hz.

10. The tractor-trailer rig of claim 8, wherein said user signal has a frequency of between 100 and 10,000 Hz.

11. The tractor-trailer rig of claim 8, wherein said user signal has a frequency of between 500 and 40,000 Hz.

12. The tractor-trailer rig of claim 8 wherein said user signal is placed on the same jack input as said right-turn signal.

* * * * *